United States Patent [19]
Arnold

[11] 4,189,275
[45] Feb. 19, 1980

[54] ATTACHMENT FOR MOUNTING A PIVOTAL AND OR SHIFTABLE LOAD HANDLING APPARATUS ON A VEHICLE

[75] Inventor: Maurice C. Arnold, Dudley, England

[73] Assignee: Ward Plant Spares (Henley) Limited, Warley, England

[21] Appl. No.: 761,671

[22] Filed: Jan. 24, 1977

[30] Foreign Application Priority Data

Jan. 24, 1976 [GB] United Kingdom ............... 2243/76
Jan. 24, 1976 [GB] United Kingdom ............... 2272/76
Oct. 15, 1976 [GB] United Kingdom ............. 42875/76

[51] Int. Cl.² .................. B65G 47/00; B66F 9/06
[52] U.S. Cl. ................... 414/640; 414/659; 414/662; 414/592
[58] Field of Search .......... 214/700, 701 R, 701 P, 214/730-731, 660, 670-674; 414/640-642, 628-632, 634-636, 660-664, 666-672, 659, 592

[56] References Cited

U.S. PATENT DOCUMENTS

| 2,437,010 | 3/1948 | Way ........................ 214/701 P |
| 2,598,865 | 6/1952 | Turner ..................... 214/701 P |
| 2,679,330 | 5/1954 | Allen ....................... 214/701 P |
| 2,904,203 | 9/1959 | Mindrum ................... 214/731 |
| 3,225,949 | 12/1965 | Erikson et al. ............ 214/660 |

FOREIGN PATENT DOCUMENTS 1909542 10/1970 Fed. Rep. of Germany ....... 214/701 P

Primary Examiner—Stephen G. Kunin
Assistant Examiner—R. B. Johnson
Attorney, Agent, or Firm—Marshall & Yeasting

[57] ABSTRACT

A device for use with fork-lift trucks or the like to provide tipping and side shift facilities for ancillary apparatus attached to the truck. The device includes first and second frames and a sub-frame with two operatively connected fluid-powered rams. There is one mounting point for an ancillary on the sub-frame and an alternative mounting point for an ancillary on the second frame, whereby an ancillary so mounted may be tipped and/or side shifted according to which ram is operated.

5 Claims, 4 Drawing Figures

ATTACHMENT FOR MOUNTING A PIVOTAL AND OR SHIFTABLE LOAD HANDLING APPARATUS ON A VEHICLE

This invention relates to vehicles of the kind provided with a mast and a carriage or frame which is guided on the mast and connected to means for raising and lowering it on the mast. One example of a vehicle of this kind is a so-called "forklift truck" where a pair of L-shaped members or forks is fixed to the carriage, particularly for lifting loads supported on box pallets, when the forks are inserted in the pallet interior. Another example of a vehicle of this kind is a so-called "rough terrain vehicle" intended for mechanical handling on building sites, farms and the like, when often a bucket is attached to the carriage.

The object of the present invention is to provide an improved device for use with vehicles of the kind referred to.

In accordance with the invention a device has a frame adapted for attachment to the carriage of a vehicle of the kind referred to, a sub-frame pivoted on said frame and adapted for connection of any of a range of ancillaries thereto, at least one ram for controlling pivotting of the sub-frame and hence tipping of a so-connected ancillary, and said sub-frame being duplicated at lateral sides of the said frame to provide an alternative position for connection of an ancillary between said sub-frames.

Preferably the alternative position is provided on a third frame which is slidable on a guide extending between the sub-frames, and the third frame is coupled to a further ram located between said guides and also coupled to one of the sub-frames; enabling side shift of an ancillary connected in said alternative position within limits defined by the spacing of said sub-frames.

Various embodiments of the invention are now more particularly described with reference to the accompanying drawings wherein.

Figure 1:
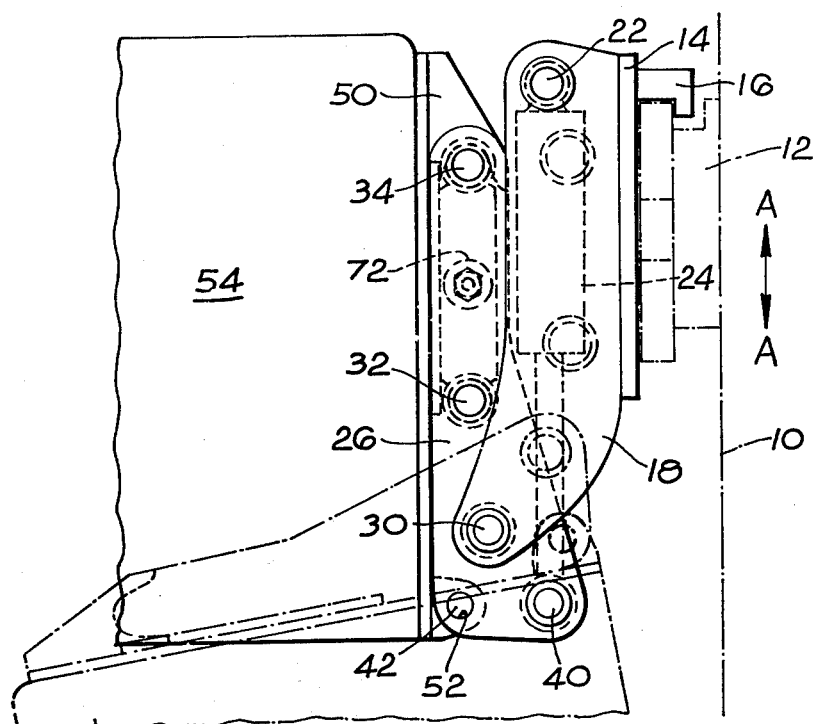
FIG. 1 is a side elevation of a device, showing a portion of an ancillary apparatus attached thereto, an alternative position of the ancillary apparatus (tipped position) being shown by the chain-dot lines.
Figure 2:
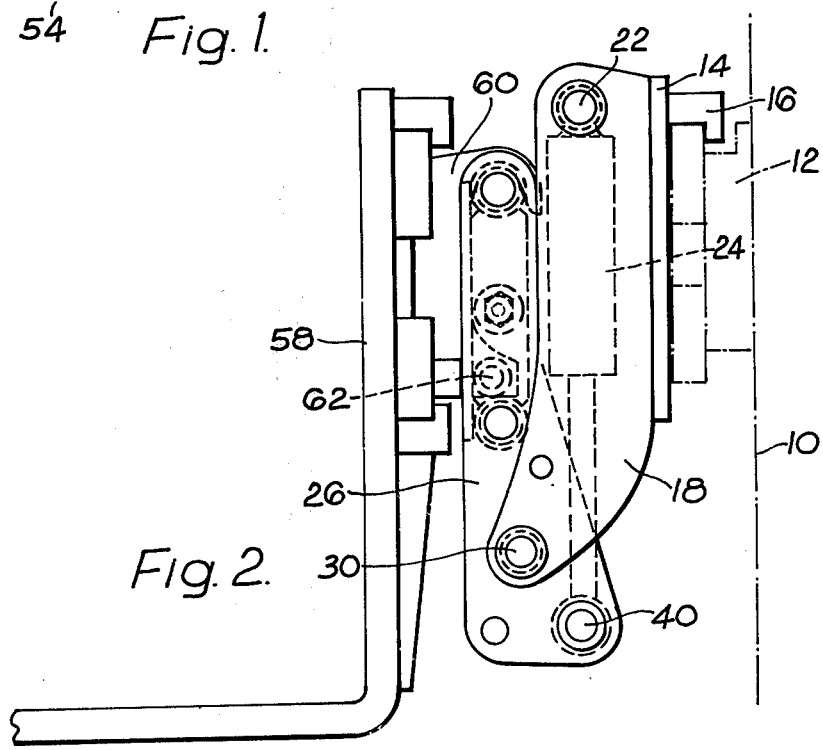
FIG. 2 is a view similar to FIG. 1, but showing a different ancillary apparatus attached.
Figure 3:
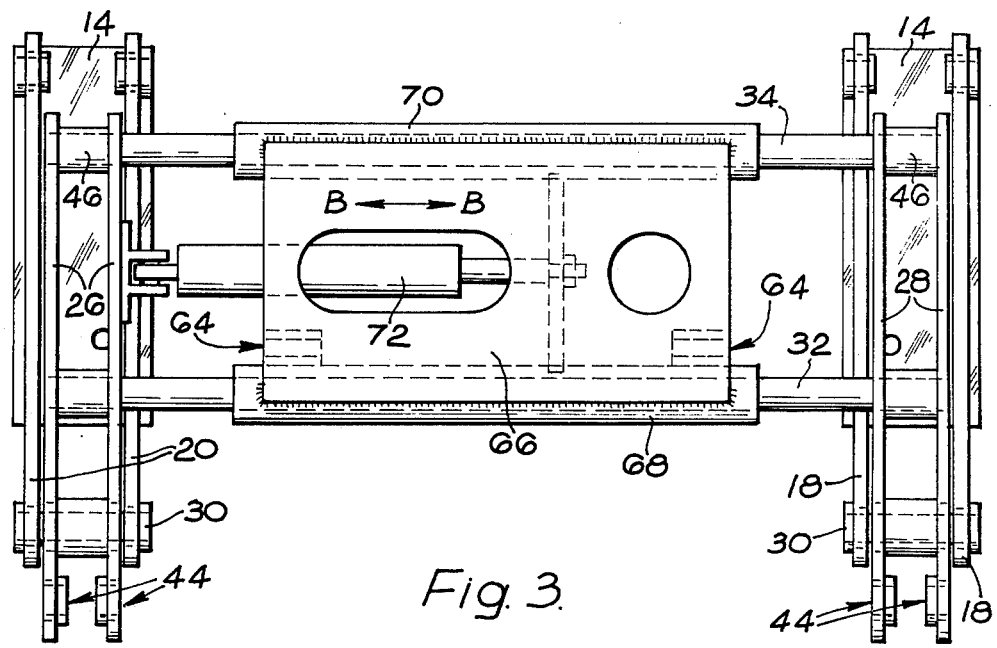
FIG. 3 is a front view of the device shown in FIG. 1 and FIG. 2, but with the ancillary apparatus omitted.

Turning now to the drawings and particularly FIGS. 1-3 thereof, the chain-dot line 10 shown in FIGS. 1 and 2 represents the front of a mast provided on a rough terrain vehicle or the like, and provided with a carriage 12 which is arranged to be displaced in the direction of the arrow A—A FIG. 1 upon the mast.

The device of the present invention comprises a back plate 14 provided with hook like portions 16 to engage with the carriage 12, and the back plate may be arranged to be secured to the carriage by additional bolts, catches or the like.

Figure 4:
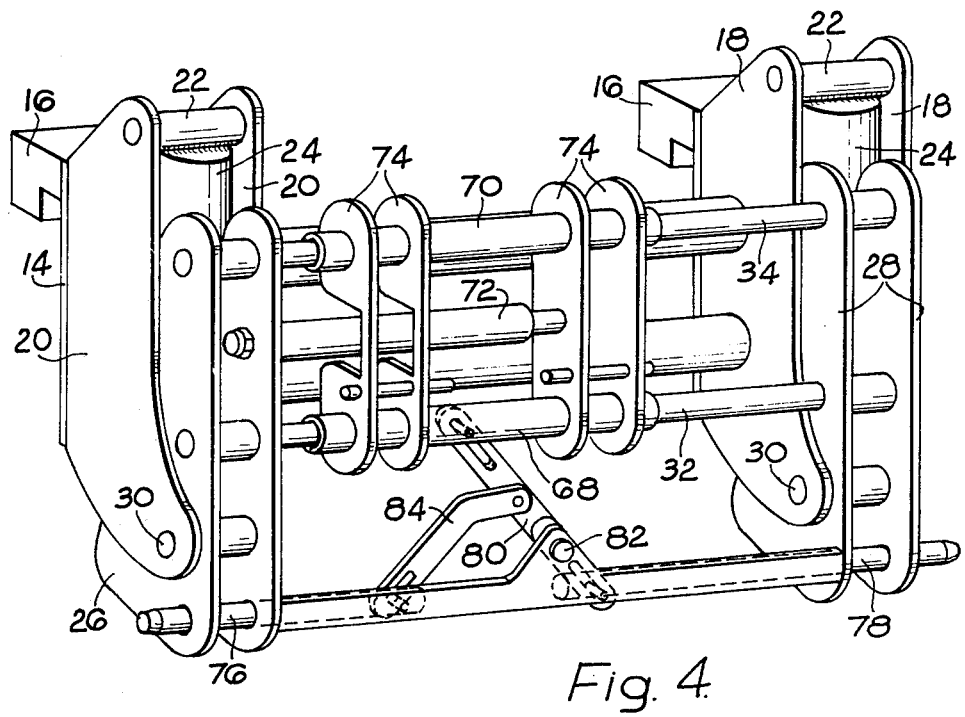
FIG. 4 is a perspective view of a modified device.

As best seen by reference to FIG. 4, the back plate is provided with two pairs of plates 18—18 and 20—20, one pair at each lateral side of the complete device. Each pair of plates provides a pivotal mounting 22 for the upper end of a tipping cylinder 24 and the tipping cylinder extends generally along the length of the plates.

The device further comprises a sub-frame which, in this embodiment, comprises like pairs of plates 26—26, 28—28, the pair 28 being pivoted between the plates 18 and the pair 26 being pivoted between the plates 20. The pivotal points are provided by pins 30. The two parts of the sub-frame, constituted by the plates 28 on the one hand and the plates 26 on the other hand are connected together by a pair of transversely extending shafts 32, 34. The plates 26 and 28 are arranged as bell cranks, being pivotally coupled to the lower ends of the tipping rams 24 by the transverse pins 40 (not shown in FIGS. 3 and 4, for clarity).

The arrangement shown in FIG. 4 differs from that in FIGS. 1-3 in the further respects described below, but the parts herein mentioned are those essential for a number of functions of the device as is now explained.

The sub-frame plates 26 and 28 may be connected to ancillary devices, for example by the use of pins 42 (FIG. 1) passed through aligned eyes 44 in the plates 26, 28. If the ancillary device is not to be freely pivoted from these plates (as would usually be the case) the connection of the ancillary device may include a hook like member or members engaged over the sleeves 46, FIG. 3.

In the case of FIG. 1, a container, for example a bucket or box, is provided with at least a pair of laterally spaced hook like members 50 engaged over the sleeves 46 as well as with apertured lugs engaged by pins 42. It will be appreciated that to pick up and engage such a box or shovel 54, the vehicle may be manoeuvred into alignment with the rear of the article 54, and the device elevated by raising the carriage 12 on the mast so that the sleeves 46 engage the hooks 50, and then the pins 42 can be inserted in place. The article 54 is then firmly secured to the device and can (for example) be pivoted between the full line position FIG. 1 and the chain-dot line position FIG. 1.

In the case of FIG. 2, a fork assembly 58 is provided which has hook like portions 60, which in this case are arranged to engage over the shaft 34 between the plates 26—26 and 28—28, and these forks can be secured against pivoting relative to the sub-frame by further pins 62 passing through a formation on the fork frame and into bores 64 provided for the purpose on a shifting plate 66.

The shifting plate 66 is mounted on a pair of sleeves 68, 70 which run on the shafts 32, 34 and is coupled by a fluid powered ram 72 connected to the side plates 26 of the sub-frame, so that the shifting plate can be displaced in the directions of the arrows B FIG. 3, and hence the forks can be laterally displaced on the device of the invention as well as being vertically displaced (by carriage 12) and being tipped by the device of the invention.

It will be appreciated that in the embodiment of FIGS. 1-3 two alternate positions are provided for attachment of ancillaries, one being between the two sets of side plates of the sub-frame and with side shift capability, and the other being to the side plates of the sub-frame without such capability.

In the arrangement shown in FIG. 4, the plate 66 is omitted, and the sleeves 68, 70 are displaceable by ram 72, these sleeves being coupled by a number of vertically extending web plates 74. This arrangement of FIG. 4 is designed to effect automatic coupling of pins 76, 78, which are analogous to the pins 42 of FIG. 1, but to do this automatically by use of the side shift ram 72. To this end, pin 78 is coupled to one end of a swinging link 80 through a pivot 82 and pin 76 is coupled to the link 80 by an intermediate link 84, the end of the link 80 remote from the pivot 82 being pivoted to sleeve 68. Hence, as the shifting assembly 68-74 moves to the right (in the figure) the link 80 turns clockwise about its pivot and thus withdraws pins 76, 78 from the aligned apertures in the side plates 26, 28, and hence subsequently a reverse movement of the shifting assembly will enable the pins to engage through the eyes in an ancillary. This may enable an ancillary to be connected or disconnected from the device without the driver of the vehicle leaving the cab.

I claim:

1. A device for use with a vehicle of the kind comprising a mast and a carriage guided on the mast, said device comprising a main frame adapted for attachment to said carriage, said main frame comprising at least one main frame plate at each lateral side of the main frame, a sub-frame pivotally mounted on said main frame plates, at least one fluid-powered first ram connected between said main frame and the sub-frame for controlling tipping of said sub-frame, a pair of shafts extending across said sub-frame, a further frame mounted on and slidably guided by said shafts, and a further fluid-powered ram coupled between the further frame and said sub-frame for controllably side shifting the further frame, said device providing one mounting point for an ancillary apparatus on said sub-frame, and an alternative mounting point for an ancillary apparatus on said further frame, whereby an ancillary apparatus so mounted may be tipped and/or side shifted according to which ram is fluid-powered, wherein said main frame comprises a pair of parallel plates at each lateral side of the main frame, and the sub-frame comprises pairs of parallel plates each of which sub-frame pairs is located between one of the pairs of plates of the main frame.

2. A device as claimed in claim 1, wherein said sub-frame plates are interconnected by said shafts.

3. A device as claimed in claim 1 wherein a first tipping ram is located between each pair of sub-frame plates, and each first ram has its upper end pivoted to the corresponding main frame plates and its lower end pivoted to the corresponding sub-frame plates.

4. A device as claimed in claim 1 wherein the further frame comprises attachment points for connection of an ancillary apparatus.

5. A device as claimed in claim 1 wherein each said pair of sub-frame plates provides at least one attachment point for an ancillary apparatus, therebetween.

* * * * *